No. 703,843. Patented July 1, 1902.
S. SMITH.
TEMPORARY COUPLING FOR CHAINS, &c.
(Application filed Jan. 9, 1902.)
(No Model.)

UNITED STATES PATENT OFFICE.

STEPHEN SMITH, OF EDINBURGH, SCOTLAND.

TEMPORARY COUPLING FOR CHAINS, &c.

SPECIFICATION forming part of Letters Patent No. 703,843, dated July 1, 1902.

Application filed January 9, 1902. Serial No. 89,010. (No model.)

*To all whom it may concern:*

Be it known that I, STEPHEN SMITH, a subject of the King of the United Kingdom of Great Britain and Ireland, and a resident of 12 Murrayfield avenue, Edinburgh, in the county of Mid-Lothian, Scotland, have invented a Temporary Coupling for Chains, &c., of which the following is a specification.

This invention relates to a coupling for chains. It may be used for the temporary connection or coupling of all kinds of chains. For example, it may be used as a coupling for ladies' chain bracelets instead of the usual spring-snap; but it is also a coupling which may be used for larger purposes, such as chains used on ships or for any other purpose—for harness, for example.

Figure 1:
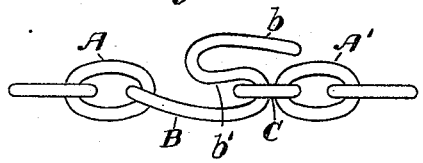
Figure 2:
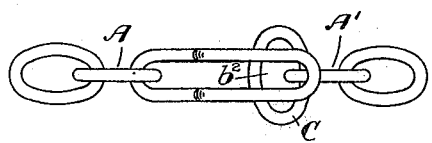
Figure 3:
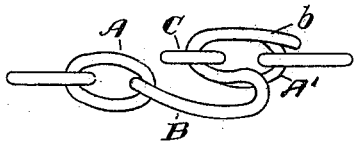

Figures 1 and 2 are elevation and plan, respectively, showing the coupling in operation. Fig. 3 shows the coupling in process of being uncoupled.

A A' are end links of a chain to be coupled. The coupling-hook B is in the form of a link, Fig. 2, bent to an S shape, Fig. 1, having a doubled-back link portion $b$. The one end of the said hook-link B is attached directly to the one end link A; but the other end of the hook-link is connected to the other link A' of the chain by means of the ring C, whose greatest internal diameter is just sufficient to pass over the width of the hook. (See Fig. 2.)

The method of coupling and uncoupling is illustrated in Fig. 3. The ring C constitutes the end link of the chain A' to be coupled and may be of the same form and dimensions as the other links of the said chain A'. In coupling and uncoupling the link or ring C is turned sidewise, so that by its elliptical form it is enabled to pass over the end $b$ of the link-formed double hook B and to be slid freely around the successive curves of the said hook, as shown in the successive positions illustrated in Figs. 3 and 1, while the second link A' of the chain is inserted between the two sides of the hook-link B and in position parallel therewith, as shown in Fig. 3. The chain A' being then pulled out to the position shown in Figs. 1 and 2, the coupling is complete, and thereafter the parts will not become uncoupled accidentally or until the second link of the chain A' is again placed between the sides of the hook-link B, as shown in Fig. 3. In this position the end link or ring C may be freely slid backward over the successive bends of the hook B and so uncoupled.

The addition of the bent back portion $b$ of the link-hook makes it impossible for the last link A' to get past the end of $b$, except by slackening the chain and moving it edgewise up through the opening $b^2$ of the hook, Figs. 2 and 3.

The exact form and proportions may be varied to suit the pattern of chain used.

The safety coupling or hook, with its links C and A', may also be applied to ropes or wires.

In addition to the connecting of the two ends of a chain or rope the coupling may also be applied for the purpose of connecting a chain or rope to another chain or rope or to a fixed point—such, for example, as the connecting of the hook itself with its links to a fixed point and the connecting of a chain or rope thereto.

I claim—

1. In a safety-coupling for the connection of chains, ropes and the like, the hook-link B formed with a doubled-back end portion $b$, substantially as and for the purposes set forth.

2. The combination of the S-formed hook-link B and a chain A' to be coupled therewith having an end link C adapted to pass over the end $b$ of said hook and a second link adapted to be inserted between the sides of the hook-link in parallel position in order to permit the end passage of the link C over and around the S-formed hook-link, as set forth.

STEPHEN SMITH.

Witnesses:
JAMES HUNTER,
R. G. AINSLIE BROWN.